United States Patent
Huang

(10) Patent No.: US 9,260,252 B2
(45) Date of Patent: Feb. 16, 2016

(54) CONVEYING DEVICE FOR LABELING MACHINE

(75) Inventor: Fu-Chuan Huang, Shuishang Township, Chiayi County (TW)

(73) Assignees: Fu-Chuan Huang, Shuishang Township, Chiayi County (TW); SHANGHAI DASE-SING PACKAGING TECHNOLOGY CO., LTD., Shanghai (CN)

( * ) Notice: Subject to any disclaimer, the term of this patent is extended or adjusted under 35 U.S.C. 154(b) by 174 days.

(21) Appl. No.: 14/116,715

(22) PCT Filed: May 16, 2011

(86) PCT No.: PCT/CN2011/000851
§ 371 (c)(1),
(2), (4) Date: Nov. 8, 2013

(87) PCT Pub. No.: WO2012/155290
PCT Pub. Date: Nov. 22, 2012

(65) Prior Publication Data
US 2014/0069777 A1    Mar. 13, 2014

(51) Int. Cl.
| | |
|---|---|
| *B65G 29/00* | (2006.01) |
| *B65G 37/00* | (2006.01) |
| *B65C 3/06* | (2006.01) |
| *B65C 9/02* | (2006.01) |
| *B29C 63/42* | (2006.01) |
| *B65G 17/46* | (2006.01) |

(52) U.S. Cl.
CPC .............. *B65G 37/00* (2013.01); *B29C 63/423* (2013.01); *B65C 3/065* (2013.01); *B65C 9/02* (2013.01); *B65G 17/46* (2013.01); *B65G 2201/0235* (2013.01)

(58) Field of Classification Search
CPC ........ B65G 23/34; B65G 65/18; B65G 65/22; B65G 15/22
USPC .............. 198/575, 595, 598, 601, 480.1, 832, 198/835, 481.1
See application file for complete search history.

(56) References Cited

U.S. PATENT DOCUMENTS

| | | | |
|---|---|---|---|
| 3,716,606 A | 2/1973 | Bazett | |
| 5,477,956 A * | 12/1995 | Liebhart | .................... 198/459.4 |
| 2007/0181403 A1* | 8/2007 | Sheets et al. | .................. 198/617 |

FOREIGN PATENT DOCUMENTS

| | | |
|---|---|---|
| CN | 1201747 A | 12/1998 |
| CN | 2441742 Y | 8/2001 |
| CN | 2637341 Y | 9/2004 |
| CN | 201158471 Y | 12/2008 |

* cited by examiner

*Primary Examiner* — Gene Crawford
*Assistant Examiner* — Lester Rushin
(74) *Attorney, Agent, or Firm* — patenttm.us

(57) ABSTRACT

A conveying device for a labeling machine is provided with a conveying belt frame (40), plurality of top seat fixtures (50) and a feeding device (60). A conveying belt (41) is mounted on the conveying belt frame (40). The top seat fixtures (50) are mounted at intervals on the conveying belt (41). A protrusion column (51) is protruded from the top surface of each top seat fixtures (50), so that a space can be formed between the bottom of containers and the top seat fixtures when the containers are mounted on the top seat fixtures. The shrinkable film labels can be set around the lower bottom of the containers after being cut by the labeling machine so that the labels can be shrunk to coat the bottom surface of the containers after being heated. The feeding device (60) cooperates with the conveying belt (41) and the top seat fixtures (50) so that the containers to be processed are conveyed by the feeding device (60) to the conveying belt (41) on the conveying belt frame.

6 Claims, 8 Drawing Sheets

CONVEYING DEVICE FOR LABELING MACHINE

BACKGROUND OF THE INVENTION

1. Field of the Invention

The invention relates to a labeling machine, and in particular to a conveying device for a labeling machine.

2. Description of the Prior Arts

Containers in our daily life such as pudding cups, beverage bottles, cosmetic containers, etc. often have a thin shrinkable film label set around their surfaces for marking or decoration. A thin shrinkable film label is placed on the surface of the container and then heated by a labeling machine so that the thin shrinkable film label can be shrunk to coat the container.

However, a conventional labeling machine is unable to coat the thin shrink film label to the bottom surface of the container because a conveying belt is utilized to convey the containers in the working process of the labeling machine. Referring to FIG. 8, since a container 20 is placed on a conveying belt 70 with a bottom surface of the container 20 contacting the conveying belt 70 when the container 20 is conveyed to a labeling machine by the conveying belt 70, a shrinkable film label 30 cannot reach the bottom of the container 20 such that the shrinkable film label 30 is unable to coat the bottom of the container 20. Therefore, the conventional labeling machine needs to be further improved.

SUMMARY OF THE INVENTION

In view of the aforementioned problem, an objective of the present invention is to provide a conveying device for a labeling machine to convey containers and allow the bottom surface of the containers to be coated by the shrinkable film label when the containers are manufactured, so as to provide containers of improved delicacy and diversities.

The conveying device of the present invention includes a conveying belt frame, a plurality of top seat fixtures, and a feeding device, wherein the conveying belt frame is an elongated frame, comprises a feed-in end and a feed-out end each respectively on two ends of the conveying belt frame, and a conveying belt is disposed on the conveying belt frame in a longitudinal direction of the conveying belt frame;

each top seat fixture has a protrusion column protruding from a top surface of the top seat fixture and is disposed on the conveying belt and spaced from the adjacent top seat fixtures by a distance, and the protrusion column extends away from the conveying belt; and the feeding device is disposed at the feed-in end of the conveying belt frame.

The feeding device comprise a base, a conveyer, a screw feeding rod, a guiding rail, a feeding member and a driving mechanism, wherein the base is a bracket and has an end located at the feed-in end of the conveying belt frame;

the conveyer is movably disposed on the base;

the screw feeding rod has a first end facing the feed-in end of the conveying belt frame and a second end, and the screw feeding rod is rotatably disposed on the base and adjacent to the conveyer, a guiding groove that is threaded is formed on a periphery of the screw feeding rod, a second driving rod is mounted through an axis of the screw feeding rod, and a third driving wheel is disposed on the second driving rod;

the guiding rail comprises a first guiding rod and a second guiding rod spaced from the first guiding rod by a distance, one end of the first guiding rod is disposed on the base and above one side of the conveyer, the other end of the first guiding rod is disposed on the feed-in end of the conveying belt frame and above one end of the conveying belt, an outer surface of the first guiding rod is spaced from the screw feeding rod, one end of the second guiding rod is disposed on the base and adjacent to the first end of the screw feeding rod, and the other end of the second guiding rod is disposed at the feed-in end of the conveying belt frame and above the other end of the conveying belt;

the feeding member is shaped as a plate having a plurality of notches on a rim of the plate, is rotatably disposed on the base and adjacent to the feed-in end of the conveying belt frame, a first driving rod is mounted through an axis of the feeding member, and a first driving wheel and a second driving wheel are disposed on the first driving rod;

the driving mechanism comprises a second shaft connected to a first wheel which is connected to the first driving wheel and synchronously rotated with the first driving wheel, and the second driving wheel is connected to the third driving wheel of the screw feeding rod and synchronously rotated with the third driving wheel.

A stroke of the guiding groove at the first end is longer than a stroke of the guiding groove at the second end.

The driving mechanism further comprises a first rod rotatably mounted on the conveying belt frame, a second wheel and a third wheel are disposed on the first rod, the second wheel and the first wheel are both bevel gears and engage with each other, and the third wheel and the first driving wheel are both sprockets and are connected to each other by a chain.

The driving mechanism further comprises a second rod, a third rod, a fourth rod and a fifth rod, wherein a fourth wheel and a fifth wheel are disposed on the second rod, the second rod is rotatably mounted on the base, and the fourth wheel is connected to the second driving wheel by a belt;

a sixth wheel and a seventh wheel are disposed on the third rod, the third rod is rotatably mounted on the base, and the sixth wheel is connected to the fifth wheel by a belt;

an eighth wheel and a ninth wheel are disposed on the fourth rod, the fourth rod is rotatably mounted on the base, and the eighth and seventh wheels are both bevel gears and engage with each other; and a tenth wheel is disposed on the fifth rod, the fifth rod is rotatably mounted on the base, and the tenth wheel is connected to the ninth wheel by a belt and connected to the third driving wheel by another belt.

The top seat fixture is a circular seat having a center on which the protrusion column is positioned.

The top seat fixture is connected to the conveying belt by a connecting member protruding from a bottom of the top seat fixture.

The feeding member is shaped as a disc.

By utilizing the described technical features, since the top seat fixtures are disposed on the conveying belt of the conveying belt frame, when containers are placed on the conveying belt, the protrusion column supports the bottom surface of the container so that a space is formed between the bottom surface of the container and the top seat fixture. When the top seat fixtures along with the containers are conveyed to a label setting device and a heating device, the label setting device sets a shrinkable film label on the containers to cover the bottom surface of the containers. When the containers with the shrinkable film label are heated, the shrinkable film label is shrunk to coat the bottom of the containers.

The feeding device feeds in the containers with assistance of the conveying belt provided with top seat fixtures. By engagement of the guiding grooves with a lateral side of the containers guided by the guiding rail, the rotation and increased stroke of the screw feeding rod provides a specific distance to each two adjacent containers, which corresponds to a distance between two adjacent notches on the feeding member. By engagement of notches with another lateral side of the containers, the feeding member rotates to move the containers sequentially to the conveying belt on the conveying belt frame along the guiding rail and place the containers on the top seat fixtures, thereby providing the automation of the conveying device of the present invention.

Elements referenced number list: 10 labeling setting device; 11 heating device; 20 container; 21 top flange; 30 film label; 40 belt frame; 401 supporter; 402 feed-in end; 403 feed-out end; 405 motor; 4051 first shaft; 4052 second shaft; 41, 42 conveying belt; 43 guiding rod; 50 top seat fixture; 51 protrusion column; 52 connecting member; 60 feeding device; 61 base; 611 supporter; 62 conveyer; 63 screw feeding rod; 631 first end; 632 second end; 633 guiding groove; 634 second driving rod; 635 third driving wheel; 64 guiding rail; 641 first guiding rod; 642 second guiding rod; 65 feeding member; 651 notch; 652 first driving rod; 653 first driving wheel; 654 second driving wheel; 66 driving mechanism; 661 housing; 6611; 662 first rod; 6621 second wheel; 6622 third wheel; 663 second rod; 6631 fourth wheel; 6632 fifth wheel; 664 third rod; 6641 sixth wheel; 6642 seventh wheel; 665 fourth rod; 6651 eighth wheel; 6652 ninth wheel; 666 fifth rod; 6661 tenth wheel; 667 fixing rod; 671 connecting member; 672 connecting member; 70 conveying belt.

DETAILED DESCRIPTION OF THE PREFERRED EMBODIMENTS

Figure 1:
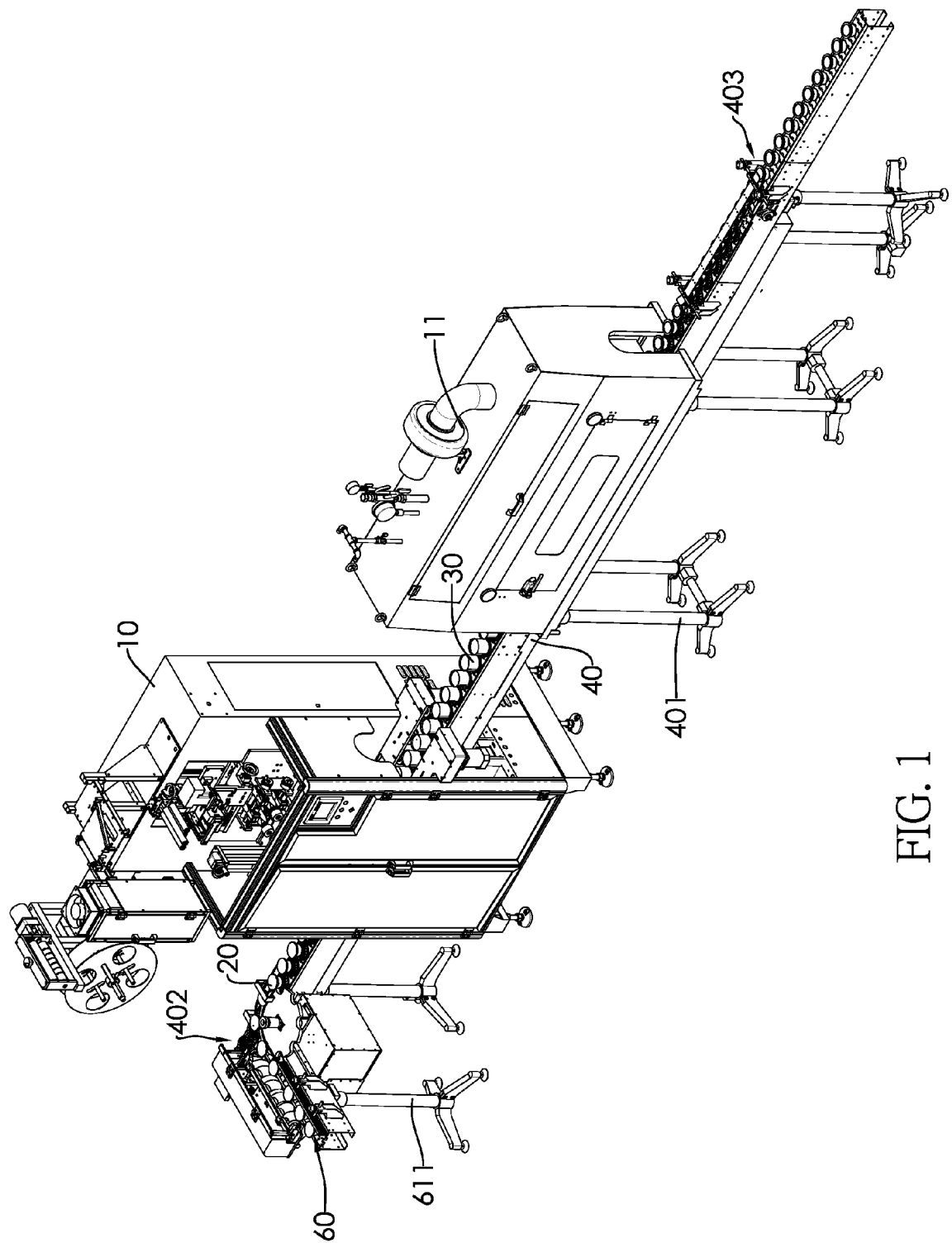
FIG. 1 is a perspective view of a conveying device of the present invention disposed on a labeling machine.

Referring to FIG. 1, a labeling machine includes a conveying device, a label setting device 10 and heating device 11. The conveying device conveys a plurality of containers sequentially to the label setting device 10 and the heating device 11. The label setting device 10 sets a shrinkable film label 30 on a container 20, and the shrinkable film label 30 is heated by the heating device 11 to be shrunk and coated on the container 20.

Figure 2:
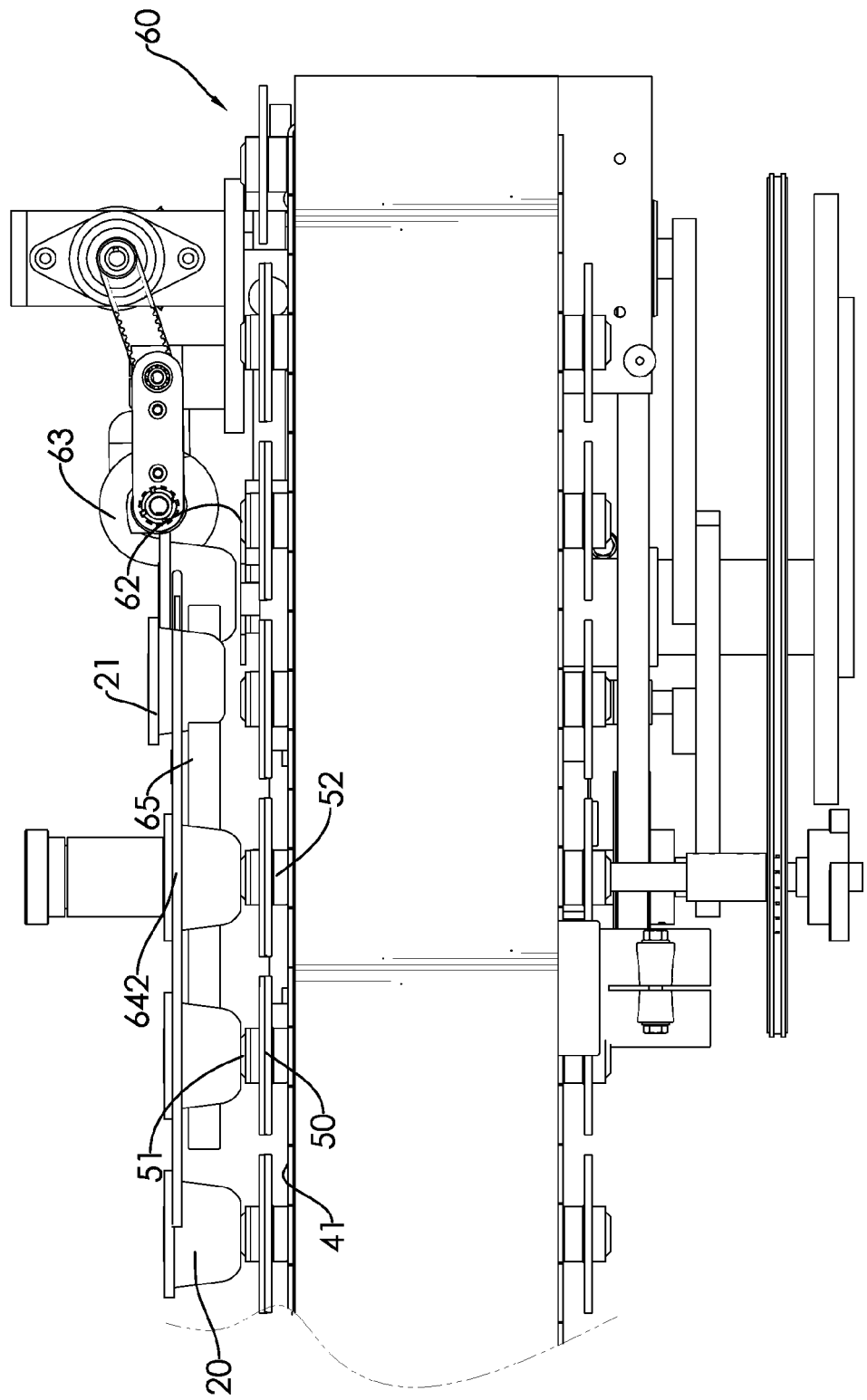
FIG. 2 is a side schematic view of the conveying device of the present invention.
Figure 3:
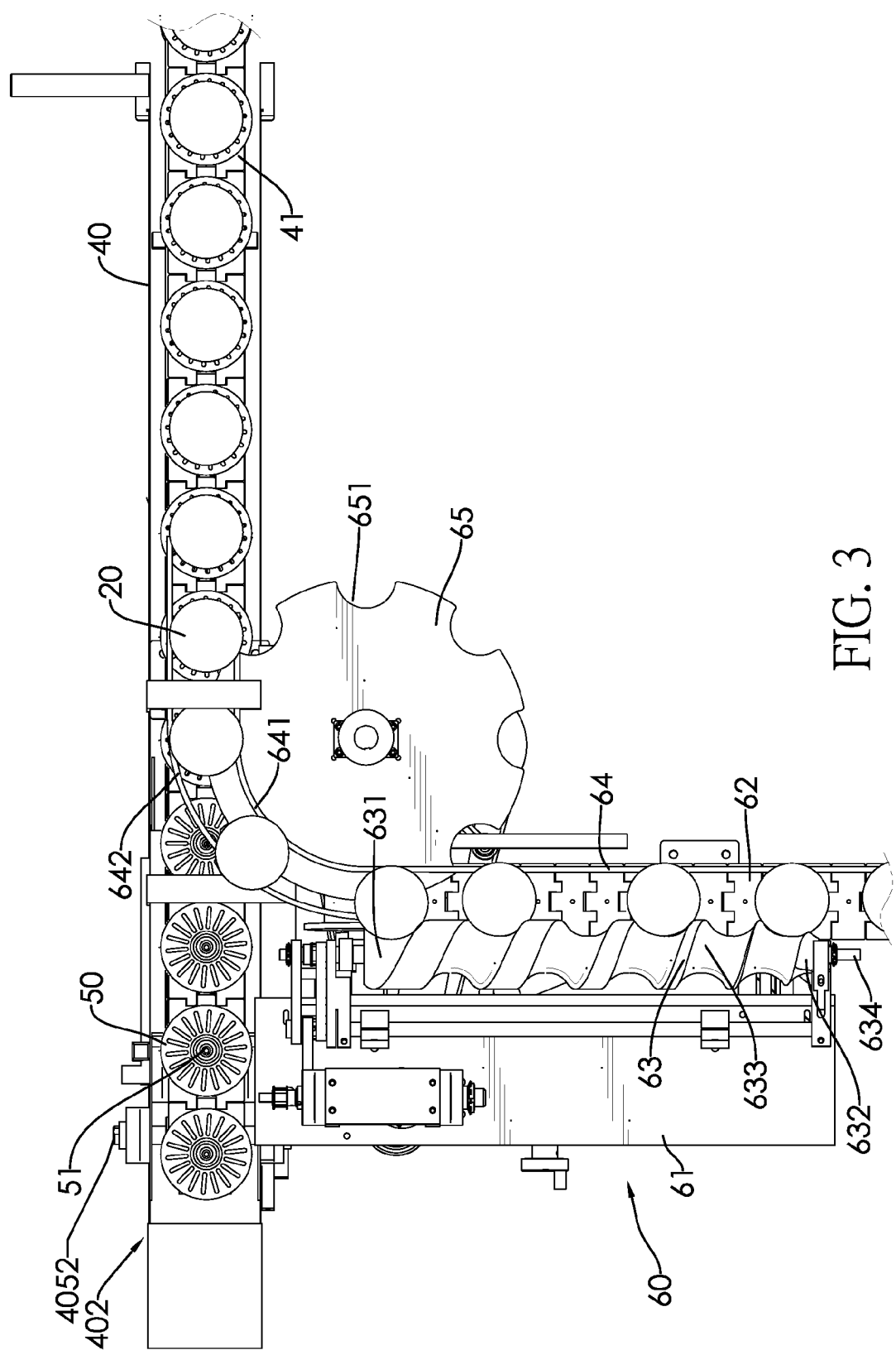
FIG. 3 is a top schematic view of the conveying device of the present invention.

The present invention provides a conveying device for said labeling machine. Referring to FIGS. 2 and 3, the conveying device includes a conveying belt frame 40, a plurality of top seat fixtures 50 and a feeding device 60.

Figure 7:
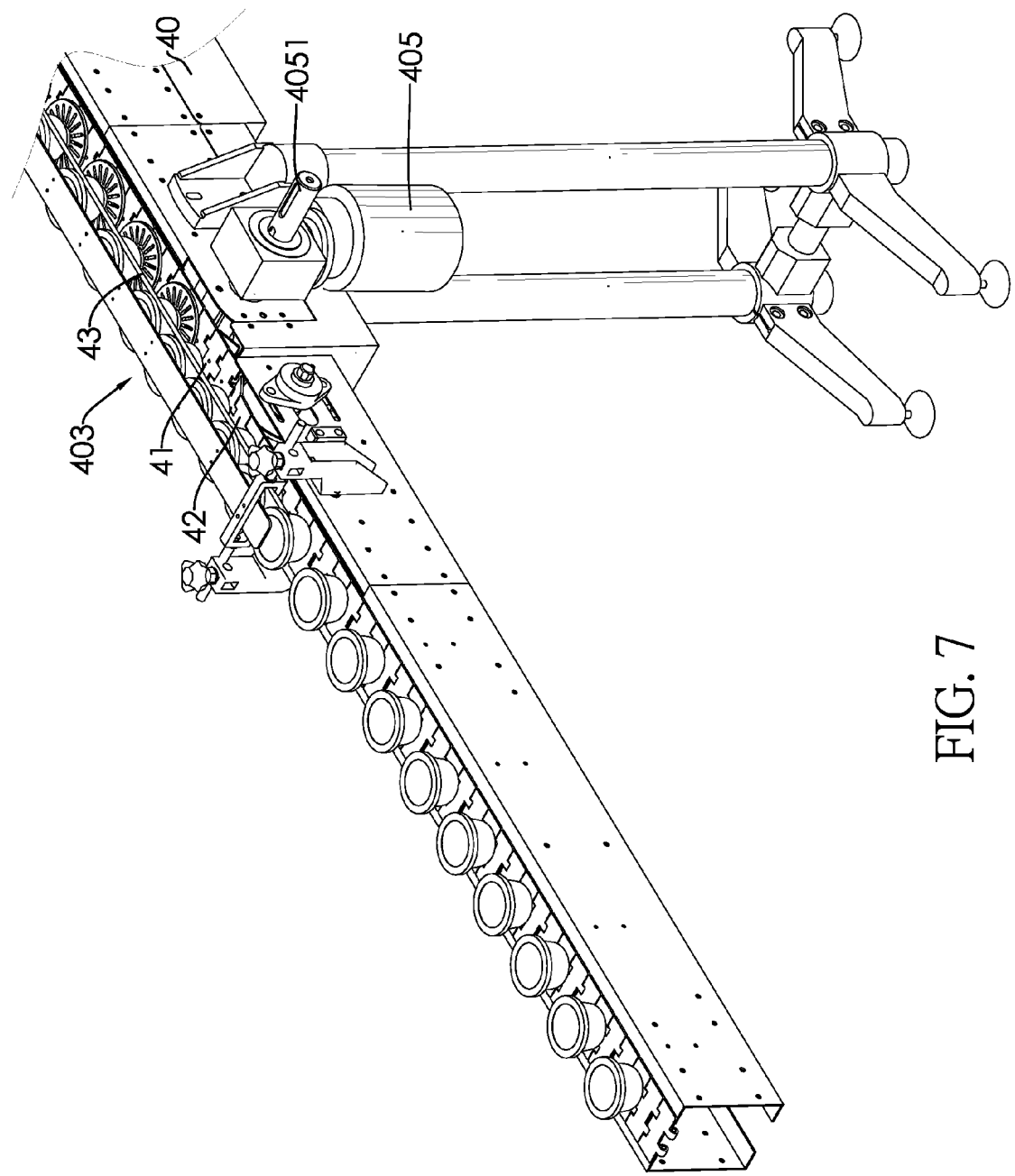
FIG. 7 depicts a position of a motor at a feed-in end.
Figure 8:
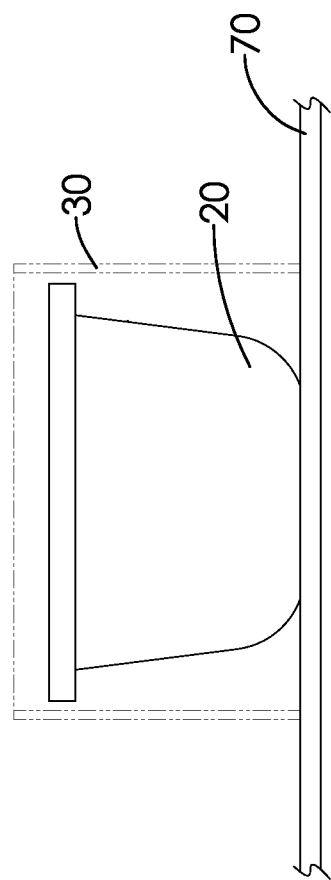
FIG. 8 is a side schematic view of a container with a conventional shrinkable film label.

The conveying belt frame 40 is an elongated frame supported by a plurality of supporters 401 on a plane. The conveying belt frame 40 has a feed-in end 402 and a feed-out end 403. Referring to FIG. 7, two conveying belts 41 and 42 are disposed on the conveying belt frame 40 in a longitudinal direction of the conveying belt frame 40. A first shaft 4051 and a motor 405 connected to the conveying belt 41 are disposed on one side of the conveying belt frame 40 at the feed-out end 403. A gear (not shown) is disposed on the first shaft 4051. Referring again to FIG. 3, a second shaft 4052 connected to the conveying belt 41 is disposed on the other side of the conveying belt frame 40 at the feed-in end 402. A gear is disposed on the second shaft 4052 (not shown). The structures of the motor 405, the first shaft 4051, the gear disposed on the first shaft 4051, the second shaft 4052 and the gear disposed on the second shaft 4052 are conventional and detailed descriptions are omitted. The motor 405 drives the first shaft 4051, the second shaft 4052 and the gears to move the conveying belt 41 in a counterclockwise direction as shown in FIG. 2. The conveying belt 41 conveys goods, such as containers 20, to the feed-out end 403. Referring to FIG. 7, one end of the conveying belt 42 is disposed at the feed-out end of the conveying belt frame 40 and adjacent to the conveying belt 41. The containers 20 are moved from the conveying belt 41 to the other conveying belt 42 smoothly by the guide of two guiding rods 43 extending from the conveying belt 41 to the other conveying belt 42. The processed containers 20 are carried away by the conveying belt 42.

Referring to FIGS. 2 and 3, a protrusion column 51 protrudes from a top surface of the top seat fixture 50. Each top seat fixture 50 is spaced from another adjacent top seat fixture 50 by a distance. The protrusion column 51 extends away from the conveying belt 41. The shapes of the top seat fixture 50 and the protrusion column 51 can be adapted to match the bottom of the containers 20. In this embodiment, the top seat fixture 50 has a circular shape, and the protrusion column 51 is a cylinder. The protrusion column 51 is disposed at the center of the top seat fixture 50, and a connecting member 52 disposed on a bottom of the top seat fixture 50 connects the top seat fixture 50 to the conveying belt 41. The containers 20 are placed on the protrusion columns 51.

Figure 4:
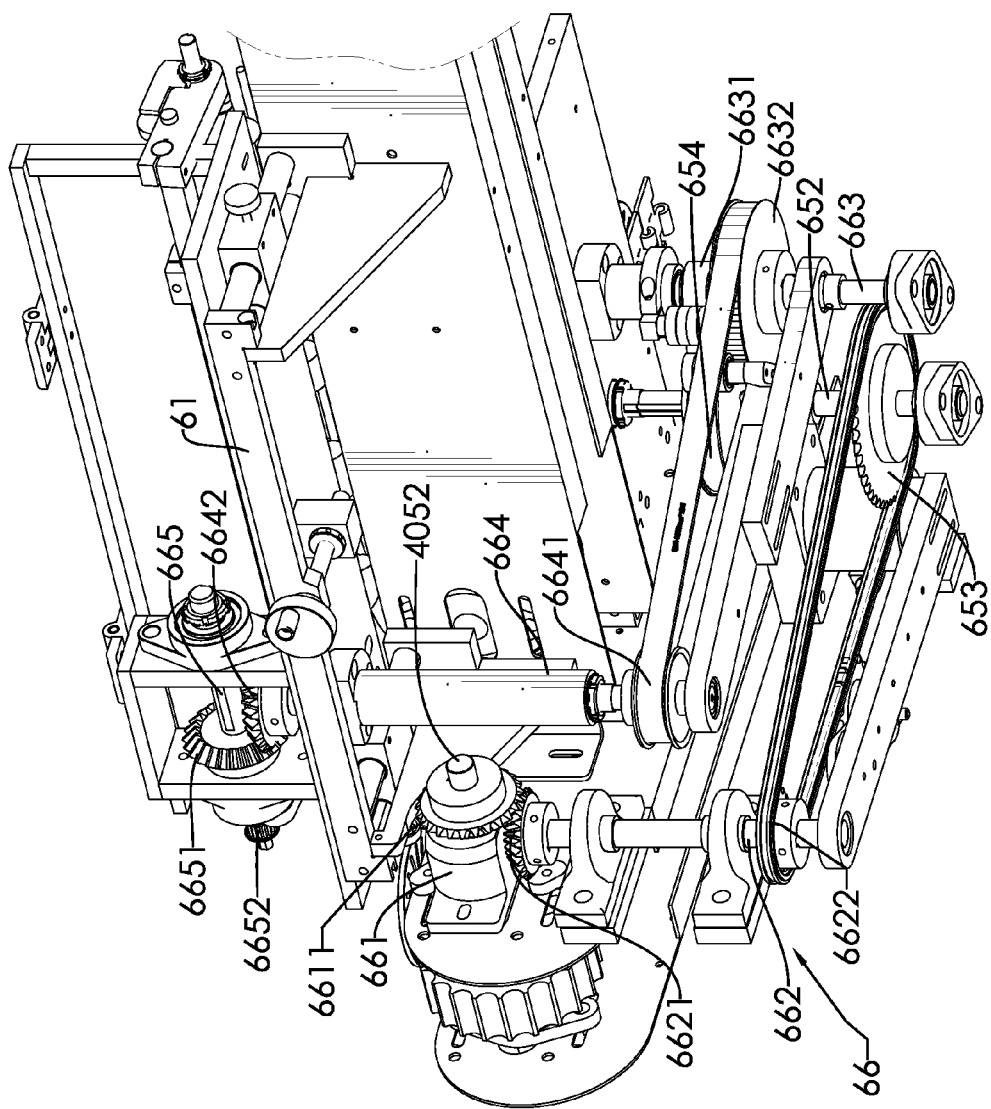
FIG. 4 is a perspective view of the conveying device of the present invention.

Referring to FIGS. 3 and 4, the feeding device 60 includes a base 61, a conveyer 62, a screw feeding rod 63, a guiding rail 64, a feeding member 65 and a driving mechanism 66.

The base 61 is a bracket. Referring to FIG. 1, the base 61 is supported on a plane by two supporters 611. One end of the base 61 is adjacent to the feed-in end 402 of the conveying belt frame 40.

The conveyer 62 is disposed on the base 61 and conveys the containers 20 to a position adjacent to the conveying belt frame 40.

Figure 5:
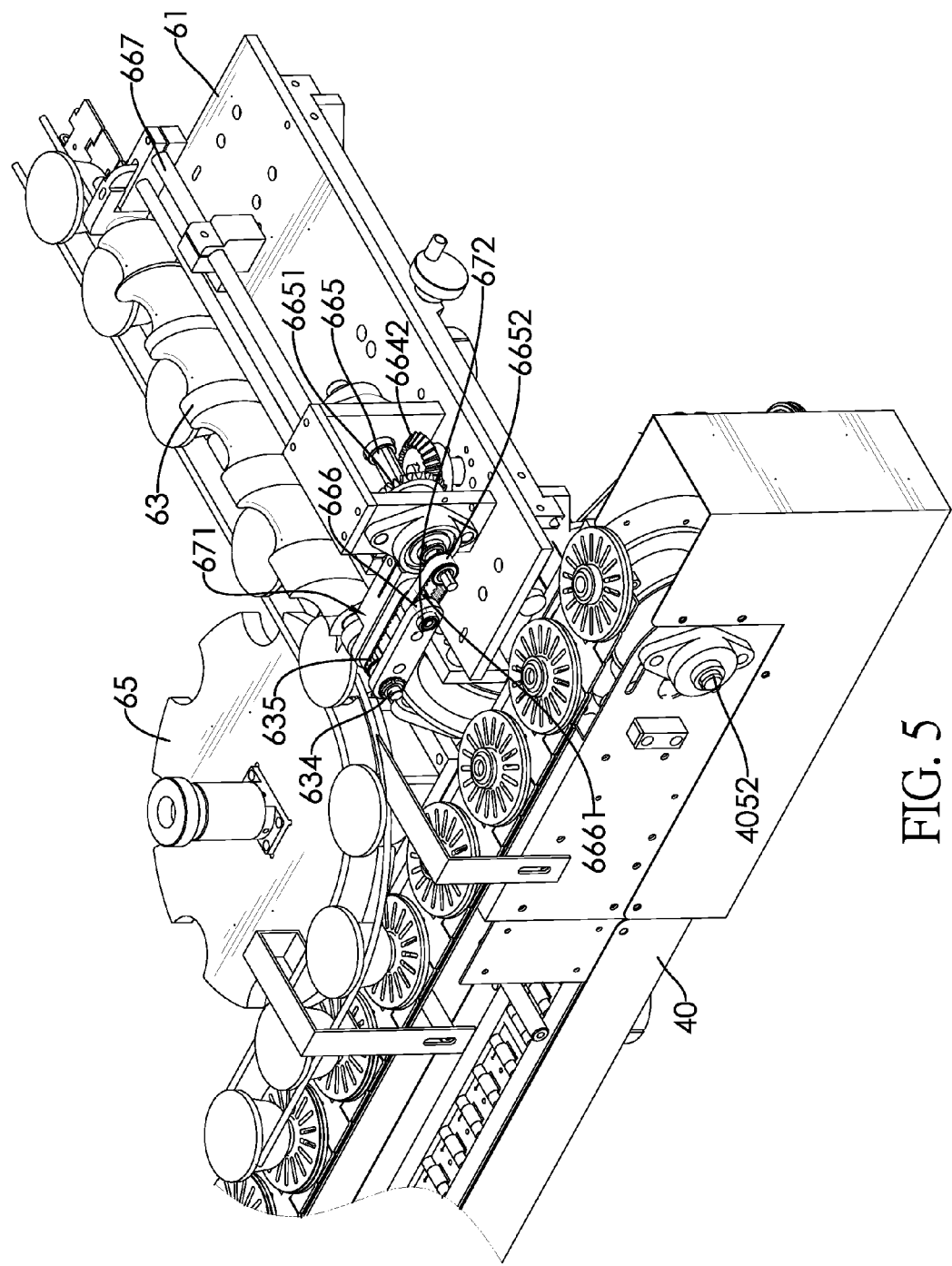
FIG. 5 is a perspective view of a driving mechanism of the present invention.

The screw feeding rod 63 has a first end 631 and a second end 632. A guiding groove 633 that is threaded is formed on an outer periphery of the screw feeding rod 63. A stroke of the guiding groove 633 at the first end 631 is longer than a stroke of the guiding groove 633 at the second end 632. The stroke means an axial displacement of the guiding groove 633 for one rotation of the screw feeding rod 63. A second driving rod 634 is mounted through an axis of the screw feeding rod 63. The screw feeding rod 63 is rotatably disposed on the base 61 and positioned above one side of the conveyer 62. The first end 631 of the screw feeding rod 63 faces the feed-in end 402 of the conveying belt frame 40. A pitch and a depth of the threads of the guiding groove 633 are adapted according to the shape of the containers 20. The pitch means a distance between two adjacent screw threads. In this embodiment, the stroke of the guiding groove 633 is gradually increased from the second end 632 to the first end 631. Referring to FIG. 5, a third driving wheel 635 is disposed on the second driving rod 634. In this embodiment, the screw feeding rod 63 is mounted on the base 61 by a fixing rod 667 and connecting members.

The guiding rail 64 includes two elongated rods spaced by a specific distance, which corresponds to an outer diameter of the container 20. The two elongated rods are a first guiding rod 641 and a second guiding rod 642. One end of the first guiding rod 641 is disposed on the base 61 and positioned above one side of the conveyer 62 that is on the base 61, and the other end of the first guiding rod 641 is disposed at the feed-in end 402 and positioned above one end of the conveying belt 41 on the conveying belt frame 40. One lateral side of the first guiding rod 641 is spaced from the screw feeding rod 63 by a distance. One end of the second guiding rod 642 is disposed on the base 61 and adjacent to the first end 631 of the screw feeding rod 63, and the other end of the second guiding rod 642 is disposed at the feed-in end 402 and positioned above the other end of the conveying belt 41 on the conveying belt frame 40. In this embodiment, a top flange 21 of the container 20 has an outer diameter larger than the distance between the first and second guiding rods 641 and 642 so that the container 20 is positioned on the guiding rail 64 by the abutment of the flange 21 against the guiding rods 641 and 642.

Figure 6:
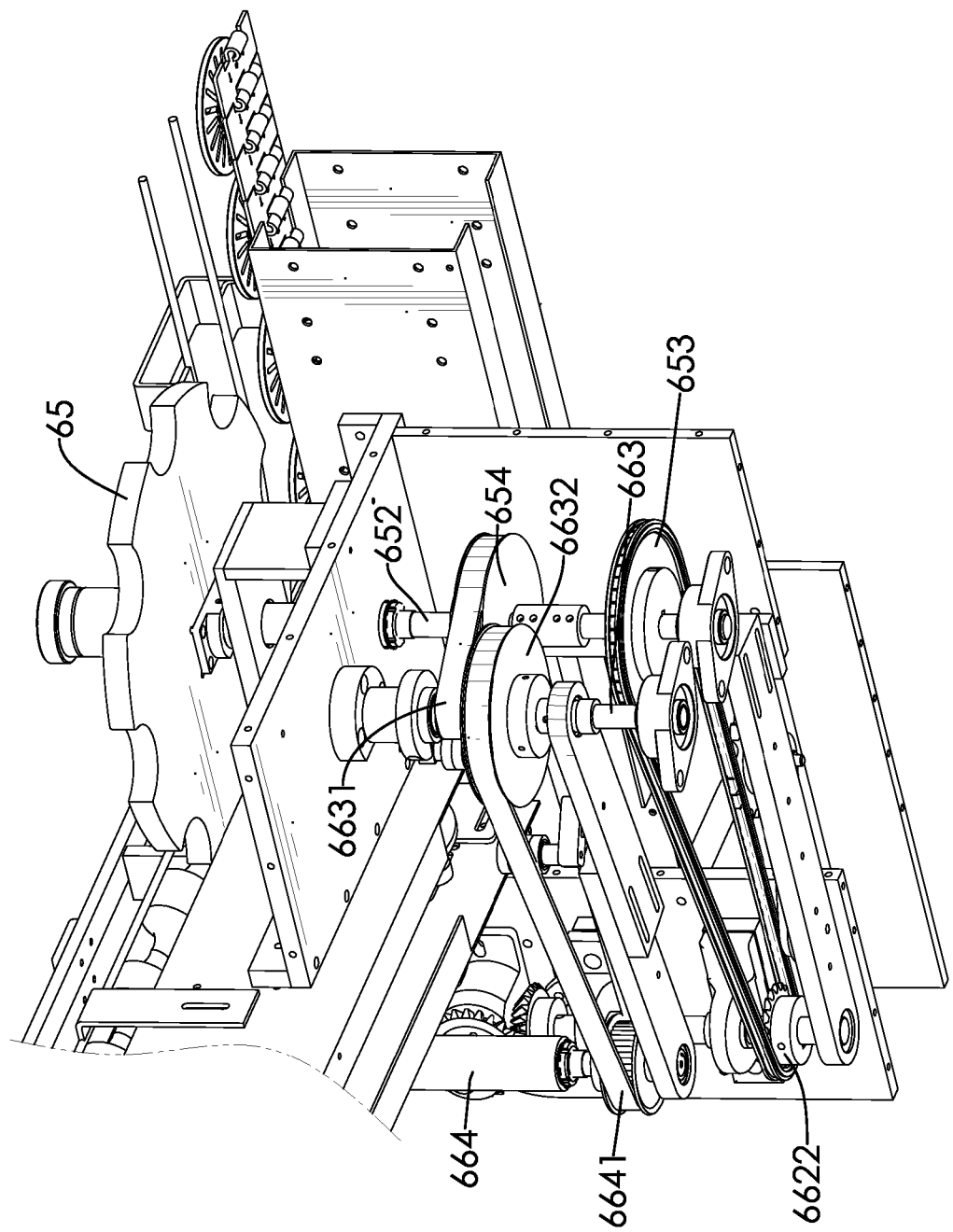
FIG. 6 is another perspective view of the driving mechanism of the present invention.

The feeding member 65 is shaped as a plate. In this embodiment, the feeding member 65 is a disc having a plurality of notches 651 formed on a rim of the disc. The distance between two adjacent notches 651 corresponds to the distance between two adjacent top seat fixtures 50. The feeding member 65 is rotatably disposed on the base 61 and is adjacent to the conveying belt frame 40. Referring to FIG. 6, a first driving rod 652 is mounted along a rotational axis of the feeding member 65. Referring to FIG. 4, in this embodiment, a first driving wheel 653 and a second driving wheel 654 are disposed on the first driving rod 652.

Referring to FIGS. 4 to 6, the driving mechanism 66 includes a housing 661, a first rod 662, a second rod 663, a third rod 664, a fourth rod 665 and a fifth rod 666.

Referring to FIG. 4, the housing 661 is disposed on the side of the conveying belt frame 40 opposite to the side on which the second shaft 4052 is disposed. One end of the second shaft 4052 extends through and protrudes from the housing 661 to connect a first wheel 6611, which is rotated by the second shaft 4052. The housing 661 enhances the stability of the first wheel 6611 during rotation. In this embodiment, the first wheel 6611 is a bevel gear.

The first rod 662 is a rod rotatably mounted on the conveying belt frame 40. A second wheel 6621 and a third wheel 6622 are disposed on the first rod 662. The second wheel 6621 is a bevel gear engaging with the first wheel 6611. The third wheel 6622 is a sprocket connected by a chain to the first driving wheel 653, which is also a sprocket.

Referring to FIGS. 4 and 6, the second rod 663 is mounted through the base 61 and rotatably disposed on the base 61. A fourth wheel 6631 and a fifth wheel 6632 are disposed on the second rod 663. The fourth wheel 6631 is connected to the second driving wheel 654 by a belt.

Referring to FIG. 4, the third rod 664 is rotatably mounted through the base 61. A sixth wheel 6641 and a seventh wheel 6642 are disposed on the third rod 664. The sixth wheel 6641 is connected to the fifth wheel 6632 by a belt, and the seventh wheel 6642 is a bevel gear.

The fourth rod 665 is rotatably mounted through the base 61. An eighth wheel 6651 and a ninth wheel 6652 are disposed on the fourth rod 665. The eighth wheel 6651 is a bevel gear engaging with the seventh wheel 6642.

Referring to a FIG. 5, the fifth rod 666 is a short rod rotatably mounted through the base 61 and located between the screw feeding rod 63 and the fourth rod 665. A tenth wheel 6661 is disposed on the fifth rod 666 and connected to the ninth wheel 6652 by a belt. The tenth wheel 6661 is also connected to the third driving wheel 635 of the screw feeding rod 63 by another belt. In this embodiment, the fifth rod 666 and the second driving rod 634 are disposed on the base 61 by two connecting members 671 and 672.

Thus, when the motor 405 rotates to drive the first shaft 4051, the conveying belt 41 and the second rod 4052, the first wheel 6611 is rotated by the rotation of the second shaft 4052, and the second wheel 6621 is rotated by the first wheel 6611. The first rod 662 and the third wheel 6622 rotate to drive the first driving wheel 653 and the feeding member 65. The second driving wheel 654 that is connected to the feeding member 65 by the first driving rod 652 rotates to drive the fourth wheel 6631, the second rod 663, the fifth wheel 6632, the sixth wheel 6641, the third rod 664, the seventh wheel 6642, the eighth wheel 6651, the fourth rod 665, the ninth wheel 6652, the tenth wheel 6661 and the fifth rod 666. The rotation of the tenth wheel 6661 drives the third driving wheel 635 of the screw feeding rod 63, whereby the screw feeding rod 63 is rotated by the second shaft 4052.

Referring to FIG. 3, a plurality of containers 20 are placed on the conveyer 62 on the base 61 and distal from the conveying belt frame 40. The conveyer 62 moves the containers 20 toward the conveying belt frame 40, and the screw feeding rod 63 separates the containers 20 and provides a distance between any two adjacent containers 20. The notches 651 of the feeding member 65 hold the containers 20 in position during the moving, and move the containers 20 to the top seat fixtures 50 on the conveying belt frame 40 along the guiding rail 64.

Referring to FIG. 2, the protrusion column 51 abuts the bottom of the containers 20 when the containers 20 are placed on the top seat fixture 50 so that the bottom of each container 20 is spaced from the top of the top seat fixture 50 by a distance. When the containers 20 supported by the top seat fixture 50 are moved to the label setting device 10 and the heating device 11, the bottom of the shrinkable film label 30 is cut by the label setting device 10 and set under the bottom of the container 20. The shrinkable film label 30 is then heated and coated around the bottom of the container 20, thereby overcoming the shortcoming of the prior art.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A conveying device characterized in that the conveying device comprises a conveying belt frame, a plurality of top seat fixtures and a feeding device, wherein
    the conveying belt frame is an elongated frame, comprises a feed-in end and a feed-out end each respectively on two ends of the conveying belt frame, and a conveying belt is disposed on the conveying belt frame in a longitudinal direction of the conveying belt frame;
    each top seat fixture has a protrusion column protruding from a top surface of the top seat fixture, and is disposed on the conveying belt and spaced from the adjacent top seat fixtures by a distance, and the protrusion column extends away from the conveying belt;
    the feeding device is disposed at the feed-in end of the conveying belt frame;

the top seat fixture is a circular seat having a center on which the protrusion column is positioned; and the top seat fixture is connected to the conveying belt by a connecting member protruding from a bottom of the top seat fixture.

2. The conveying device as claimed in claim 1 characterized in that the feeding device comprise a base, a conveyer, a screw feeding rod, a guiding rail, a feeding member and a driving mechanism, wherein the base is a bracket and has an end located at the feed-in end of the conveying belt frame;

the conveyer is movably disposed on the base;

the screw feeding rod has a first end facing the feed-in end of the conveying belt frame and a second end, and the screw feeding rod is rotatably disposed on the base and adjacent to the conveyer, a guiding groove that is threaded is formed on a periphery of the screw feeding rod, a second driving rod is mounted through an axis of the screw feeding rod, and a third driving wheel is disposed on the second driving rod;

the guiding rail comprises a first guiding rod and a second guiding rod spaced from the first guiding rod by a distance, one end of the first guiding rod is disposed on the base and above one side of the conveyer, the other end of the first guiding rod is disposed on the feed-in end of the conveying belt frame and above one end of the conveying belt, an outer surface of the first guiding rod is spaced from the screw feeding rod, one end of the second guiding rod is disposed on the base and adjacent to the first end of the screw feeding rod, and the other end of the second guiding rod is disposed at the feed-in end of the conveying belt frame and above the other end of the conveying belt;

the feeding member is shaped as a plate having a plurality of notches on a rim of the plate, is rotatably disposed on the base and adjacent to the feed-in end of the conveying belt frame, a first driving rod is mounted through an axis of the feeding member, and a first driving wheel and a second driving wheel are disposed on the first driving rod;

the driving mechanism comprises a second shaft connected to a first wheel which is connected to the first driving wheel and synchronously rotated with the first driving wheel, and the second driving wheel is connected to the third driving wheel of the screw feeding rod and synchronously rotated with the third driving wheel.

3. The conveying device as claimed in claim 2 characterized in that a stroke of the guiding groove at the first end of the screw feeding rod is larger than a stroke of the guiding groove at the second end of the screw feeding rod.

4. The conveying device as claimed in claim 3 characterized in that the driving mechanism further comprises a first rod rotatably mounted on the conveying belt frame, a second wheel and a third wheel are disposed on the first rod, the second wheel and the first wheel are both bevel gears and engage with each other, the third wheel and the first driving wheel are both sprockets and are connected to each other by a chain.

5. The conveying device as claimed in claim 4 characterized in that the driving mechanism further comprises a second rod, a third rod, a fourth rod and a fifth rod, wherein a fourth wheel and a fifth wheel are disposed on the second rod, the second rod is rotatably mounted on the base, and the fourth wheel is connected to the second driving wheel by a belt;

a sixth wheel and a seventh wheel are disposed on the third rod, the third rod is rotatably mounted on the base, and the sixth wheel is connected to the fifth wheel by a belt ;

an eighth wheel and a ninth wheel are disposed on the fourth rod, the fourth rod is rotatably mounted on the base, and the eight and seventh wheels are both bevel gears and engage with each other; and a tenth wheel is disposed on the fifth rod, the fifth rod is rotatably mounted on the base, and the tenth wheel is connected to the ninth wheel by a belt and connected to the third driving wheel by another belt.

6. The conveying device as claimed in claim 2 characterized in that the feeding member is shaped as a disc.

* * * * *